United States Patent [19]

Helmbold

[11] 3,843,915
[45] Oct. 22, 1974

[54] SERVO-MOTOR CONTROL SYSTEM INCLUDING A TWO PHASE DIGITAL SHAFT POSITION DETECTOR

[75] Inventor: James E. Helmbold, Kettering, Ohio

[73] Assignee: The National Cash Register Company, Dayton, Ohio

[22] Filed: Feb. 2, 1973

[21] Appl. No.: 329,268

[52] U.S. Cl. ............... 318/602, 318/603, 318/608, 318/640
[51] Int. Cl. .................................... G05b 19/28
[58] Field of Search ........... 318/602, 603, 604, 608, 318/594, 640

[56] References Cited
UNITED STATES PATENTS

| | | | |
|---|---|---|---|
| 2,656,106 | 10/1953 | Stabler | 318/603 X |
| 2,823,345 | 2/1958 | Ragland et al. | 318/602 |
| 2,885,613 | 5/1959 | Myracle et al. | 318/604 |
| 2,926,335 | 2/1960 | Bower | 318/603 X |
| 2,947,929 | 8/1960 | Bower | 318/603 X |
| 3,165,680 | 1/1965 | Morrison | 318/603 |
| 3,512,060 | 5/1970 | Floyd | 318/604 UX |

Primary Examiner—T. E. Lynch
Attorney, Agent, or Firm—J. T. Cavender; Albert L. Sessler, Jr.; Edward Dugas

[57] ABSTRACT

Apparatus for providing digital signals indicating the direction and amount of rotation of a stepping motor which apparatus utilizes a code element having at least two code tracks positioned thereon such that each track is located at a different radius from the center of the code element. The code element is rotated past an index point by any rotating device. Means are provided for reading the code in each track and for providing pulse signals indicative of the code in each track. Logic means are utilized for counting the number of pulses from one or both provided signals to determine the amount of code element rotation with respect to the index point, and for comparing the relative occurrence of pulses in at least two provided signals to determine the direction of rotation of the code element.

2 Claims, 7 Drawing Figures

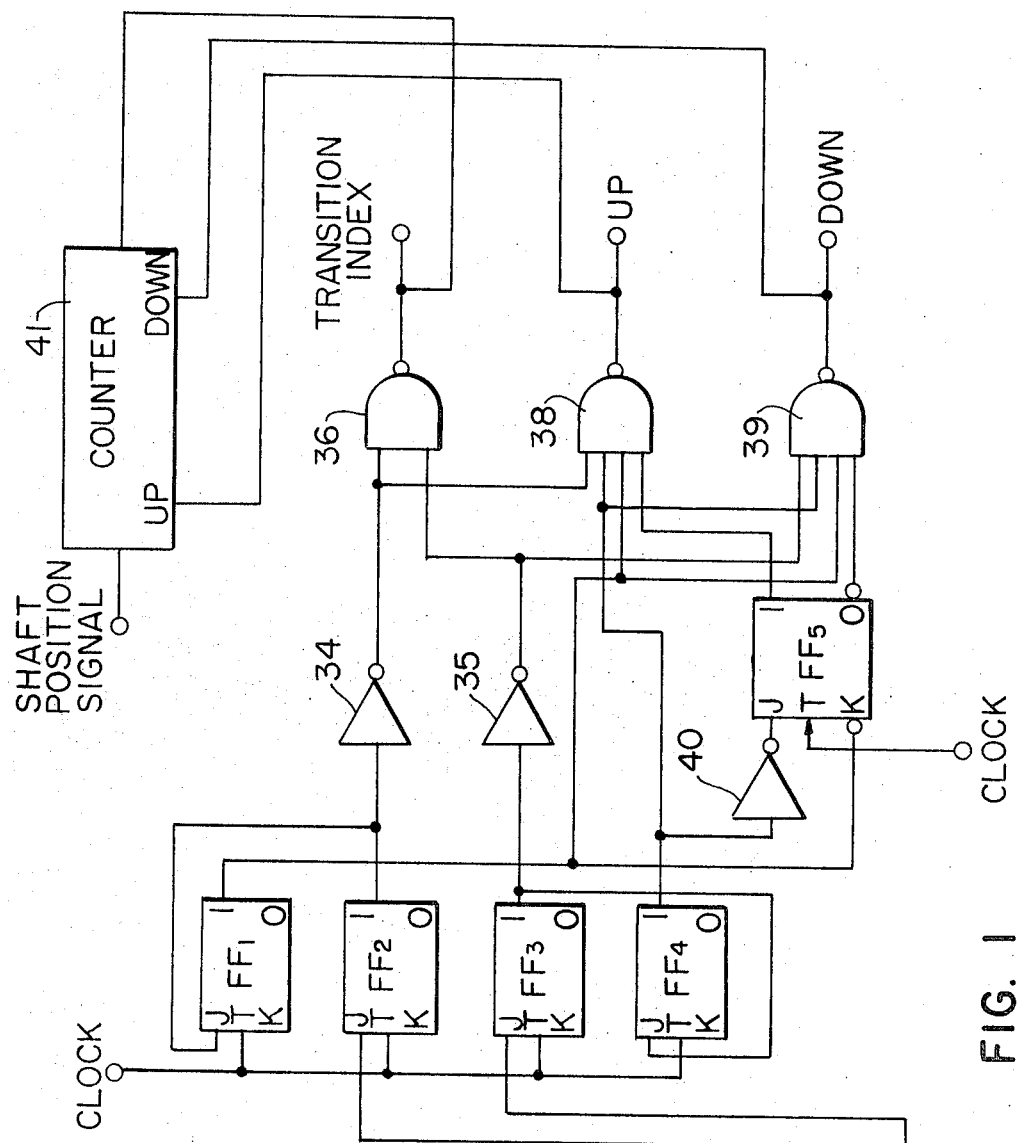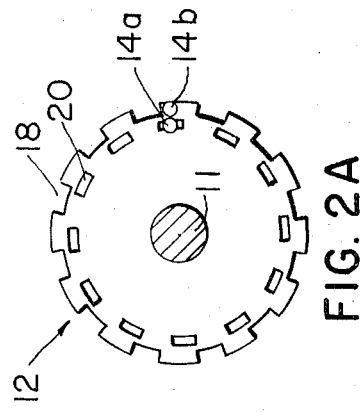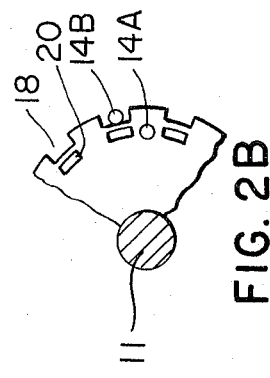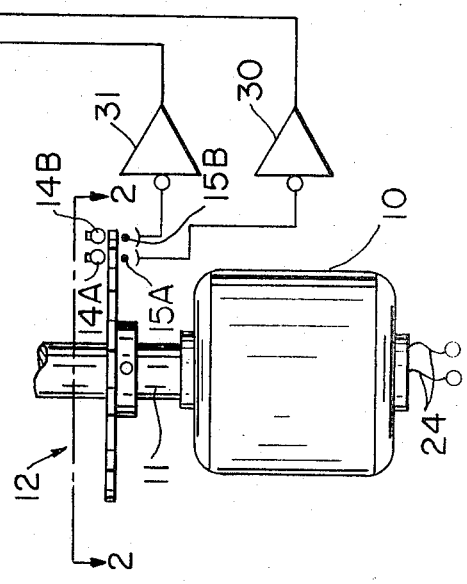
FIG. 1
FIG. 2A
FIG. 2B

SERVO-MOTOR CONTROL SYSTEM INCLUDING A TWO PHASE DIGITAL SHAFT POSITION DETECTOR

BACKGROUND OF THE INVENTION

The present invention relates to a system which provides signals indicative of the direction and amount of rotation of a stepping motor. The system finds particular utility when used in combination with an electronic print out device, such as a typewriter. When used in this manner the stepping motor is used to rotate the platen to a particular line. A document can be moved to a selected line (line finding) by providing stepping signals to the motor in a correct direction until the amount of actual rotaton of the platen, as sensed by the present system, is equal to the selected rotation. Various prior art devices have been developed to control and detect the position of a stepping motor shaft but the circuitry required is complex and expensive. In addition when a stepping motor is driven by an electronic circuit, loss of synchronism between the position of the output shaft and the electronic circuitry is possible if noise rather than the intended logic signals randomly initiates output shaft rotation. It is also possible for the stepping motor to commence rotating in the wrong direction from the halted condition. It is therefore desirable to have a means for verifying the position and direction of rotation of a motor shaft which means would also be insensitive to noise.

SUMMARY OF THE INVENTION

In the present invention there is provided a two track code wheel disc which is coupled to a stepping motor through a shaft. The code on each track is identical with each track being positioned at a different radius from the center of the code wheel. Optical means are used to detect the code and to generate a train of pulses for each track as the code wheel is rotated past the optical means. A fixed delay may be introduced into the code of one track by skewing the position of the optical means associated with each track or by skewing the position of the code on each track. Logic means coupled to receive the train of pulses stores two successive transitions of signal from each of the two code tracks and continually compares the transitions to determine which code transition precedes the other so as to indicate the direction of code wheel rotation while also providing an output indicative of the number of transitions so as to indicate the amount of code wheel rotation. From the foregoing it can be seen that it is a primary object of the present invention to provide an improved system for verifying the direction and amount of rotation of a shaft.

It is another object of the invention to provide a simplified shaft rotation verification system which utilizes inexpensive components.

These and other objects of the present invention will become more apparent when taken in conjunction with the following description and drawings in which like characters indicate like parts and which drawings form a part of the present disclosure.

BRIEF DESCRIPTION OF THE DRAWINGS

FIG. 1 illustrates the preferred embodiment of the invention in partial schematic form;

FIG. 2A is a sectioned view of the embodiment shown in FIG. 1, taken along the section lines 2—2;

FIG. 2B is an enlarged segmented view of a second embodiment of the sectioned embodiment shown in FIG. 2A;

DESCRIPTION OF THE PREFERRED EMBODIMENT OF THE INVENTION

Figure 3:
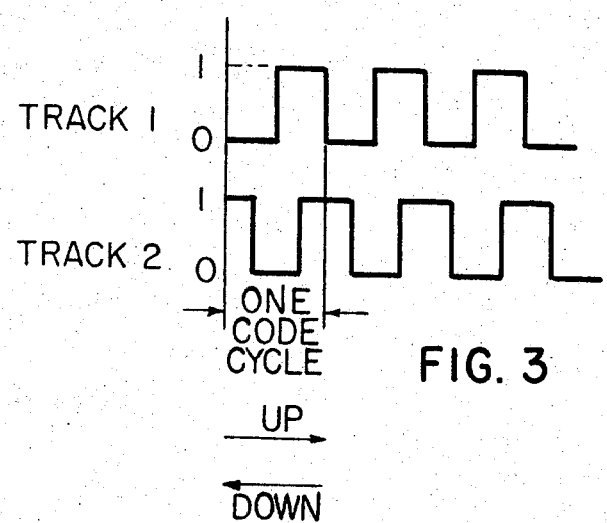
FIG. 3 illustrates the waveforms derived from the code wheel.

Referring to FIG. 1 in conjunction with FIG. 2A; a stepping motor 10 having a drive shaft 11 onto which is affixed a two track code element 12, which may be a wheel, is driven in a selected direction for a desired period of time by the application of a drive signal, or signals, to terminals 24. In the preferred embodiment the stepping motor steps in 15° increments. Means for effecting the desired amount of rotation, or shaft positioning, for stepping motors are well known in the prior art and are not shown herein for purposes of clarity. The two track code wheel 12, for the embodiment disclosed, displays a code, on the outermost track, of equally spaced notches 18 cut through the periphery of the wheel. Twelve notches are used, in this embodiment, to each represent 30° of shaft angle. A transition taking place at each leading and trailing edge of a notch will therefore occur at 15° of arc angle, which angle corresponds to the stepping increment of the motor. A second code track is formed in the code wheel by a plurality of defined openings 20, which correspond in number to the number of notches 18. The openings are offset (skewed) a fixed amount with respect to the location of the notches. The amount of skew between the first and second tracks, when used, is not critical, except that the displacement must be greater than the time period of one clock pulse in order to detect which track has a transition occurring first. Two radiation sources 14A and 14B are positioned along a code wheel radius line and aligned such that source 14B radiates through the notches 18 when a notch is positioned below sources 14B and source 14A radiates through the openings 20 when an opening is positioned below source 14A. Radiation sensitive elements 15A and 15B are positioned to receive the radiation from sources 14A and 14B respectively. The radiation sensitive devices used in the preferred embodiment provides a false (low) indication when bombarded with radiation and a true (high) indication otherwise. The radiation source and radiation sensitive element, for one track, may be skewed with respect to the source and sensitive element for the other track in lieu of skewing the notches with respect to the openings to achieve the same desired result. This embodiment is shown in FIG. 2B. The signals representing the condition of the radiation sensors 14A and 14B are amplified by inverting amplifiers 30 and 31 respectively. Because amplifiers 30 and 31 are of the inverting type their output will be true when their inputs are false and false when the inputs are true. The time that a particular state is maintained is determined by the speed of rotation of the code wheel. In the preferred embodiment the stepping motor is rotated at approximately 25 RPM. A four bit latch is formed using flip-flops $FF_1$, $FF_2$, $FF_3$ and $FF_4$. Each of these flip-flops can be of the J-K type. The output of amplifier 31 is fed to the J terminal of flip-flop $FF_2$. The output of amplifier 30 is fed to the J terminal of $FF_3$. A clock signal is fed to the T terminal of all the flip-flops. In practice the clock signal has a frequency of 30KC. The frequency of the clock signal must be maintained substantially higher than the frequency of rotation of the code wheel.

The outputs of flip-flops $FF_2$ and $FF_3$ are fed to the J inputs of flip-flops $FF_1$ and $FF_4$ respectively, and to the inputs of inverters 34 and 35, respectively. In operation with a true level signal on the J terminal of $FF_2$ the receipt of a clock pulse on the T terminal of $FF_2$ will cause a true signal to appear at the output labeled 1. The rising edge of the clock pulse triggers the flip-flops therefore, one clock pulse later the output state of $FF_2$ is loaded into $FF_1$. An identical operation occurs for $FF_3$ and $FF_4$ except that the input signal to $FF_3$ differs in phase from the signal applied to $FF_2$ by the amount of skew used in the code tracks. The output states of $FF_1$ and $FF_2$ change for a pulse transition of the signal at the output of amplifier 31 but one and two clock periods later, respectively.

The output state signals of $FF_2$ and $FF_3$ are fed to inverters 34 and 35, respectively, as first and second output signals which are inverted and fed to AND gate 36. The output of gate 36 is a signal which is proportional to the number of transitions occurring in the first and the second code track. The output states of inverters 34 and 35 are also fed to AND gates 38 and 39, respectively. The output state signals of $FF_1$ and $FF_4$ as third and fourth output signals are fed as inputs to both gates 38 and 39. The flip-flop $FF_5$ receives on its J input the output state of $FF_4$ after it is passed through an inverter 40. The output state of $FF_1$ is fed to the K input of $FF_5$. The "one" output of $FF_5$ is connected as an input to gate 38. The "zero" output is connected as an input to gate 39. A true signal at the output of gate 38 indicates an "up" condition, with a true signal on the output of gate 39 indicating a "down" condition. Shaft position can be determined by feeding the "up" and "down" signals to the up and down terminals respectively of an up-down counter 41 so as to control the direction of count while feeding the transition index signal from gate 36 to the count input of the counter. The output of the counter will then be a count that is proportional to the actual position of the shaft.

The state of $FF_5$ is determined by the states of $FF_1$ and $FF_4$. When the "one" terminal of $FF_1$ is high and the "one" terminal of $FF_4$ is also high, then $FF_5$ will have a "true" state at its "zero" terminal. Inverter 40 inverts the output of $FF_4$ to a "low" state. Gate 39 will then have all true signals at its inputs indicating a down condition. Gate 38 will have one "low" signal from the "one" terminal of $FF_5$. When the "one" terminal of $FF_1$ is low and the "one" terminal of $FF_4$ is also low then $FF_5$ will have a true state at its "one" terminal. Inverter 40 converts the low from the "one" terminal of $FF_4$ into a true signal. Gate 38 will then have at least one low signal at its input, preventing any gating action. Because the "one" terminals of $FF_1$ and $FF_4$ are connected to the gate inputs of both gates 38 and 39 neither gate can function unless there exists a true signal at the "one" output terminals of both $FF_1$ and $FF_4$. In sequence then it is necessary to have a true signal present on the "one" terminals of $FF_1$ and $FF_4$, caused by a true signal being present on the "one" terminal of $FF_2$ and $FF_3$ during the immediate preceeding clock period, followed by a low signal appearing on the "one" terminal of either $FF_2$ or $FF_3$. If $FF_2$ is low then gate 38 will be turned on. If $FF_4$ is low then gate 39 will be turned on.

Figure 2C:
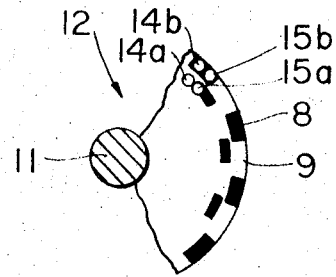
FIG. 2C is an enlarged segmented view of a third embodiment of the sectioned embodiment shown in FIG. 2A.

FIG. 2C illustrates a third possible embodiment of the code wheel 12, wherein alternate light and dark areas, 9, 8, respectively are arranged on the code wheel in two different tracks following the pattern of open and closed areas shown in FIG. 2A. In this embodiment the radiation sources 14A and 14B are positioned so as to direct radiation onto the light and dark areas as the areas move into the path of the radiation from the sources with reflection of the radiation being sensed by the radiation sensors 15A and 15B. The radiation sensors are positioned on the same side of the code wheel as the radiation sources.

In FIG. 3 the outputs from amplifier 31 and 30 are shown for a period during which the stepping motor is rotating. The outputs are a series of pulses labeled TRACK 1 and TRACK 2 respectively. The pulse levels, corresponding to light and dark, are labeled 1 for the presence of light and 0 for the absence of light. Rotation of the code wheel 12 in a clockwise direction is called the "up" direction with the counterclockwise direction being called the "down" direction. One code cycle is equal to four different transition periods of the signal states of TRACK 1 and TRACK 2 combined.

Figure 4:
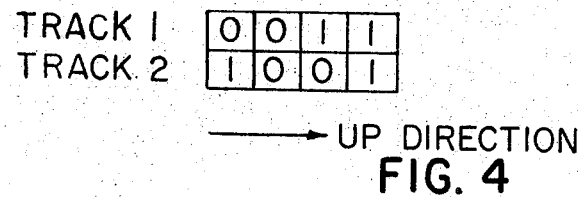
FIG. 4 is a chart comparing signal level transitions between the two track code signals for an up rotation.
Figure 5:
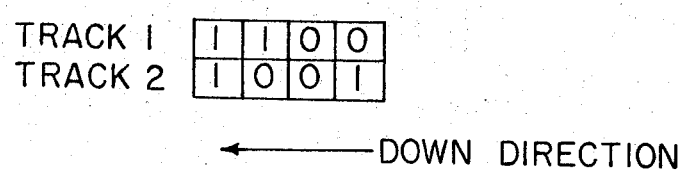
FIG. 5 is a chart comparing signal level transitions between the two track code signals for a down rotation.

In FIG. 4 the bit samples that are taken at each transition time, during up movement of the code wheel, for each track are labeled TRACK 1 and TRACK 2. Note that the first transition after a zero-zero is a one-zero, with the code wheel moving in an up direction. Referring now to FIG. 4, it will be noted that the first transition after a zero-zero is a zero-one transition. In FIG. 5 the code wheel is moving in the down direction. The direction of the code wheel rotation is thus determined by whether the transition is a zero-one or a one-zero after the occurrence of a zero-zero.

While there has been shown what is considered to be the preferred embodiment of the invention it will be manifest that many changes and modifications may be made therein without departing from the essential spirit of the invention. It is intended, therefore, in the annexed claims, to cover all such changes and modifications that may fall within the true scope of the invention.

What is claimed is:

1. Apparatus for providing signals indicating the direction and incremental rotation of a shaft comprising in combination:
   a. a code element coupled to said shaft, said code element having a transition code thereon;
   b. means for detecting and converting the code into a first and a second electrical signal, respectively, which signals have states corresponding to the transition code;
   c. logic means for receiving said first and said second electrical signal and for providing a first and a second output signal having corresponding states, said logic means also providing a third and a fourth output signal indicating the state of said first and said second output signals respectively a fixed time interval later;
d. means responsive to said third and fourth output signals for providing a first and a second transition signal wherein said first transition signal is indicative of the occurrence of a preselected state of said third signal preceding a preselected state of said fourth signal, and said second transition signal is indicative of the occurrence of a preselected state of said fourth signal preceding a preselected state of said third signal;
e. first gate means receiving said first and said second output signal for providing an indexing signal upon each coincidence of said first and said second output signals;
f. a second and third coincidence gate means for receiving said first, and said second output signals, respectively, said first and said second transition signals, respectively, and both of said third and fourth ouput signals, to provide a first direction signal at the output of said second coincidence gate when all signals received by said second coincidence gate are of one state and a second opposite direction signal at the output of said third coincidence gate when all signals received by said third coincidence gate are of one state; and
g. means for counting each of said indexing signals in an order determined by said first and second direction signals such that the accumulated count is proportional to the total rotation of said shaft.

2. The system according to claim 1 wherein said code element is comprised of a disc having apertures which define said code, and wherein said detecting means comprises photoelectric means for detecting the presence or absence of an aperture and for providing electrical signals indicative of the detected presence or absence of an aperture.

* * * * *